(12) United States Patent
Verhoeven

(10) Patent No.: US 10,440,892 B2
(45) Date of Patent: Oct. 15, 2019

(54) THRESHING AND SEPARATING SYSTEM WITH HELICAL SLATS FOR AN AGRICULTURAL HARVESTER

(71) Applicant: CNH Industrial America LLC, New Holland, PA (US)

(72) Inventor: Marcel Verhoeven, Zedelgem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/473,225

(22) Filed: Mar. 29, 2017

(65) Prior Publication Data
US 2017/0280628 A1    Oct. 5, 2017

(30) Foreign Application Priority Data
Mar. 29, 2016   (BE) .................................. 2016/5220

(51) Int. Cl.
| | |
|---|---|
| *A01F 12/24* | (2006.01) |
| *A01F 7/04* | (2006.01) |
| *A01F 12/44* | (2006.01) |
| *A01F 12/46* | (2006.01) |
| *A01F 12/20* | (2006.01) |

(52) U.S. Cl.
CPC ................ *A01F 12/24* (2013.01); *A01F 7/04* (2013.01); *A01F 12/20* (2013.01); *A01F 12/444* (2013.01); *A01F 12/446* (2013.01); *A01F 12/46* (2013.01)

(58) Field of Classification Search
CPC ........ A01F 12/10; A01F 12/442; A01F 12/39; A01F 12/24; A01F 7/04; A01F 12/00
USPC ....... 460/70, 73, 113, 75, 110; 56/14.6, 16.5
See application file for complete search history.

(56) References Cited

U.S. PATENT DOCUMENTS

| | | | |
|---|---|---|---|
| 682,193 A | * | 9/1901 | Heggem .................. A01F 12/00 460/113 |
| 2,255,244 A | | 9/1941 | Fink |
| 2,301,536 A | | 11/1942 | Greenwood et al. |
| 3,512,533 A | | 5/1970 | Loewen |
| 3,555,790 A | * | 1/1971 | Quick .................... A01D 57/10 460/16 |

(Continued)

FOREIGN PATENT DOCUMENTS

| | | |
|---|---|---|
| CN | 2497534 Y | 7/2002 |
| CN | 203482650 U | 3/2014 |

(Continued)

*Primary Examiner* — Arpad Fabian-Kovacs
(74) *Attorney, Agent, or Firm* — Peter K. Zacharias; Patrick M. Sheldrake

(57) ABSTRACT

A threshing and separating system includes a concave; a shaft defining an axis of rotation which is parallel to the concave and transverse to a longitudinal axis; and a plurality of slats rotated by the shaft and configured to move crop material against the concave. The slats have a helical shape winding around the axis of rotation. The slats include a first set of slats being predominantly on a left side of the shaft and having a left-handed helical shape, and a second set of slats being predominantly on a right side of the shaft and having a right-handed helical shape. At least one slat of said first set of slats is staggered relative to a closest slat of said second set of slats, such that a portion of a slat length of said at least one slat is overlapped with one or more adjacent slats of said second set.

13 Claims, 7 Drawing Sheets

(56) References Cited

U.S. PATENT DOCUMENTS

| | | | | |
|---|---|---|---|---|
| 4,170,235 | A | * | 10/1979 | Ashton .................. A01F 12/10 460/16 |
| 4,282,703 | A | * | 8/1981 | Wilson .................. A01F 12/10 56/14.6 |
| 4,310,005 | A | | 1/1982 | De Busscher et al. |
| 4,505,279 | A | | 3/1985 | Campbell et al. |
| 4,653,515 | A | * | 3/1987 | Tophinke ................ A01F 12/10 460/78 |
| 4,889,517 | A | | 12/1989 | Strong et al. |
| 4,976,654 | A | * | 12/1990 | Dammann ................ A01F 7/06 460/80 |
| 5,112,279 | A | * | 5/1992 | Jensen .................. A01F 12/442 460/69 |
| 5,334,093 | A | * | 8/1994 | Jensen .................. A01F 12/442 460/107 |
| 5,342,239 | A | * | 8/1994 | West .................... A01F 12/22 460/110 |
| 5,454,758 | A | * | 10/1995 | Tophinke ................ A01F 7/06 460/68 |
| 5,556,337 | A | * | 9/1996 | Tophinke ................ A01F 7/06 460/70 |
| 5,645,484 | A | * | 7/1997 | Claas .................... A01F 12/182 460/62 |
| 5,733,192 | A | * | 3/1998 | Jones .................... A01F 12/22 460/106 |
| 5,919,086 | A | | 7/1999 | Derry |
| 6,938,754 | B2 | * | 9/2005 | Kanaris ................ B65G 39/073 198/494 |
| 7,527,142 | B1 | * | 5/2009 | Zeltwanger .......... B65G 39/073 198/494 |
| 8,109,815 | B2 | * | 2/2012 | Hollatz .................. A01F 12/10 460/16 |
| 8,118,652 | B2 | * | 2/2012 | Hollatz .................. A01F 12/10 460/113 |
| 9,043,959 | B2 | * | 6/2015 | Esken .................... A01F 12/10 |
| 9,338,945 | B2 | * | 5/2016 | Becker .................. A01F 12/10 |
| 2002/0187820 | A1 | * | 12/2002 | Voss ...................... A01F 7/067 460/73 |
| 2005/0096108 | A1 | | 5/2005 | Van Quekelberghe et al. |
| 2011/0009251 | A1 | * | 1/2011 | Derscheid .............. A01F 15/18 492/30 |
| 2012/0100898 | A1 | * | 4/2012 | Mygind .................. A01F 7/067 460/22 |
| 2012/0186945 | A1 | * | 7/2012 | Laughlin .............. B65G 39/073 198/494 |
| 2013/0310120 | A1 | * | 11/2013 | Duquesne .............. A01F 12/16 460/105 |
| 2013/0341162 | A1 | * | 12/2013 | Kowalski .............. B65G 23/04 198/842 |
| 2015/0237805 | A1 | * | 8/2015 | Suen ........................ A01F 7/04 460/16 |
| 2016/0023849 | A1 | * | 1/2016 | Hamilton, Jr. ....... B65G 39/073 198/835 |

FOREIGN PATENT DOCUMENTS

| | | | | |
|---|---|---|---|---|
| DE | | 83132 | C | 11/1894 |
| DE | | 259673 | C | 1/1911 |
| EP | | 1033071 | A1 | 9/2000 |
| GB | | 1277032 | A | 6/1972 |
| JP | | 2010-11780 | A | 1/2010 |
| SU | | 1257107 | A1 * | 9/1986 ............ C21D 9/36 |
| WO | WO-2009001216 | A2 * | 12/2008 ............ A01F 7/06 |
| WO | | 2009154030 | A1 | 12/2009 |

\* cited by examiner

THRESHING AND SEPARATING SYSTEM WITH HELICAL SLATS FOR AN AGRICULTURAL HARVESTER

CROSS REFERENCE TO RELATED APPLICATION

This application claims priority to Belgium Application No. 2016/5220 filed Mar. 29, 2016, the contents of which are incorporated herein by reference.

FIELD OF THE INVENTION

The present invention relates to agricultural harvesters, and, more specifically to combine agricultural harvesters.

BACKGROUND OF THE INVENTION

An agricultural harvester known as a "combine" is historically termed such because it combines multiple harvesting functions with a single harvesting unit, such as picking, threshing, separating, cleaning, and temporary storage. A combine includes a header which removes the crop from a field, and a feeder housing which transports the crop matter into a threshing drum. The threshing drum rotates within a perforated housing, which may be in the form of adjustable concaves and performs a threshing operation on the crop to remove the grain from the straw. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris, which is also called material other than grain (MOG), toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, chaser bin, straight truck, or the like; and an unloading system on the combine is actuated to transfer the grain into the vehicle.

More particularly, a threshing or separating system includes one or more drums which can extend transversely, in the case of what is known as a "conventional" combine, or axially, in the case of what is known as a "rotary" combine, within the body of the combine, and which are partially or fully surrounded by a perforated concave. The crop material is threshed and separated by the rotation of the drum within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through horizontally arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi-trailer, chaser bin, straight truck or the like by an unloading system on the combine that is actuated to transfer grain into the vehicle.

In conventional combines, where the drum extends transversely, the drum typically has spaced apart slats extending along the width of the drum. The slats rotate in order to contact crop material that has passed through the header and rub the crop material against the concave to thresh and separate the crop material. Due to the geometry and spacing of the slats, there are periods during rotation of the drum that no slats are contacting the entering crop material, i.e., feeding by the drum and slats is discontinuous. When the drum further rotates and one or more of the slats comes into contact with the crop material, a large peak load is created during contact which can lead to rumbling and audible noises in the combine, which reduces operator comfort. Further, the high peak loads can accelerate wear on the slats and are not ideal for power transmission because the irregular power requirements of the drum to discontinuously press crop material against the concave cause cycled, irregular power demand on the power take-off. Similarly, the threshing and separation of the crop material is irregular, which can cause inefficiencies in the separation system and consequently cause inefficient cleaning in the cleaning system. U.S. Pat. No. 2,301,536 A and DE 259 673 C disclose threshing drums with helically arranged threshing slats.

What is needed in the art is a threshing and separating system that addresses some of the previously described disadvantages of known threshing and separating systems.

SUMMARY OF THE INVENTION

The present invention provides a threshing and separating system with slats that are arranged to have continuous contact with crop material to reduce cycling and associated peak loads produced during the feeding process.

The invention in one form is directed to an agricultural harvester defining a longitudinal axis in a travel direction of the harvester and including a chassis; and a threshing and separating system carried by the chassis. The threshing and separating system includes a concave; a shaft defining an axis of rotation which is parallel to the concave and transverse to the longitudinal axis; and a plurality of slats rotated by the shaft and configured to move crop material against the concave. The agricultural harvester is characterized in that the slats have a helical shape winding around the axis of rotation. Said plurality of slats includes a first set of slats being predominantly on the left side of the shaft and having a left-handed helical shape, and a second set of slats being predominantly on the right side of the shaft and having a right-handed helical shape. At least one slat of said first set of slats is staggered relative to a closest slat of said second set of slats, such that a portion of a slat length of said at least one slat is overlapped with one or more adjacent slats of said second set.

An advantage of the present invention is that at least one of the slats of the present threshing and separating system can be in contact with crop material at all times, lowering the peak loads experienced during contact with the crop material.

Another advantage is that the lifetime of the slats can be increased.

Yet another advantage is that the reduction in peak loads reduces the noise and vibrations throughout the combine, increasing the comfort of the combine's driver.

Yet another advantage is crop material can be continuously threshed and separated, improving the efficiency of the cleaning system.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
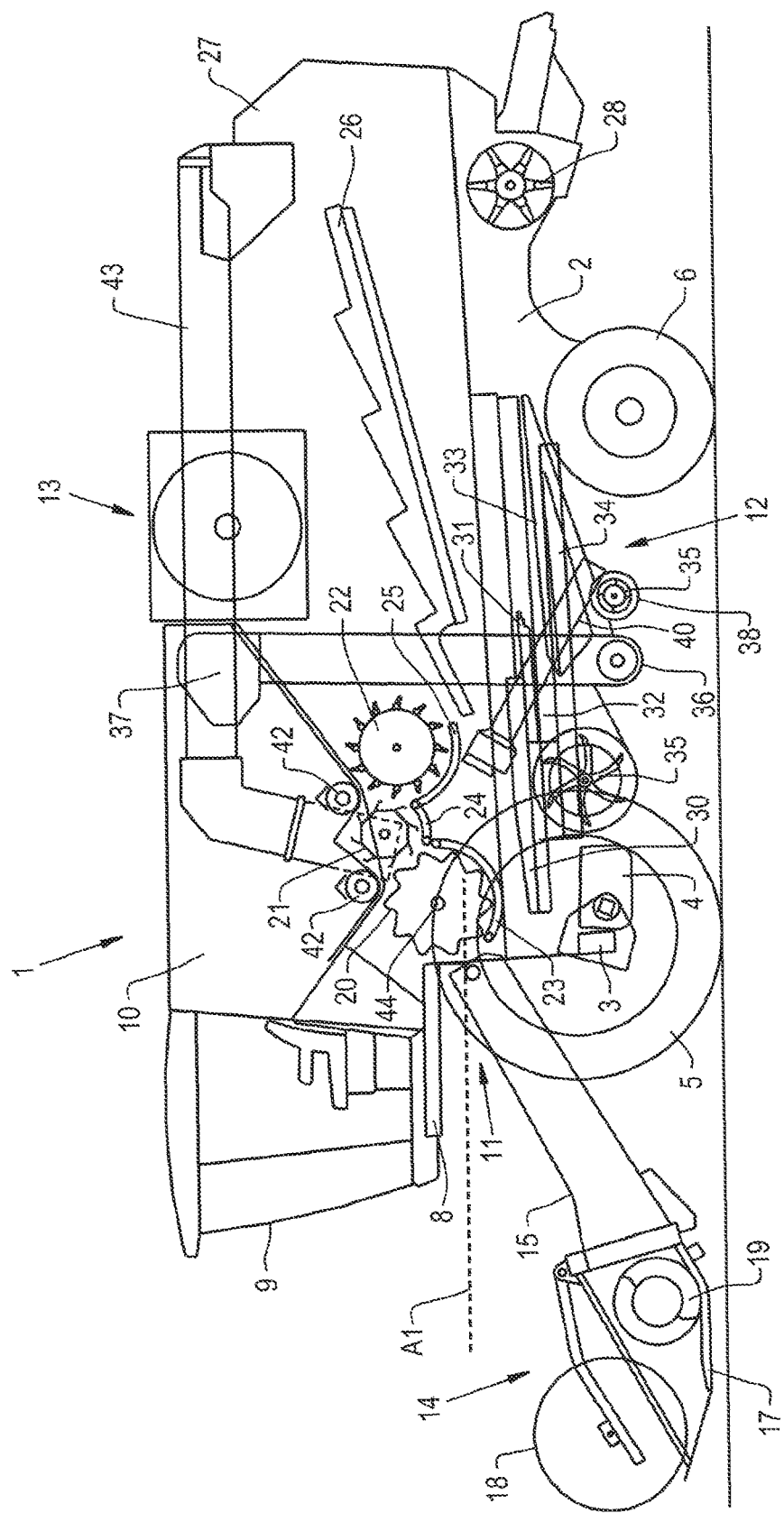
FIG. 1 is a side view of an embodiment of an agricultural harvester in the form of a combine formed according to the present invention.

Referring now to the drawings, and more particularly to FIG. 1, a combine harvester, generally indicated at 1, comprises a main chassis or frame 2, supported on a fixed front axle 3 and an oscillating rear axle (not shown). The combine 1 defines a longitudinal axis A1 which extends generally parallel to a travel direction of the combine 1. The front axle 3 carries a traction gearbox 4, that is drivingly connected to a pair of drive wheels 5, supporting the front portion of the frame 2. The rear axle is supported by a pair of steerable wheels 6. Mounted onto the main frame 2 are an operator's platform 8, with an operator's cab 9, a grain tank 10, a threshing and separating system 11, a grain cleaning system 12, and a power plant or engine 13. A conventional grain header 14 and straw elevator 15 extend forwardly of the main frame 2 and are pivotally secured thereto for generally vertical movement, that is controlled by extensible hydraulic cylinders (not shown).

As the combine harvester 1 is propelled forwardly over a field with standing crop, the latter is severed from the stubble by a sickle bar 17 at the front of the header 14 and guided by a reel 18 and an auger 19 to the straw elevator 15, that supplies the cut crop to the threshing and separating system 11. The crop received therein is threshed and separated, that is to say, the crop is rubbed and beaten, whereby the grain, seed or the like, is loosened and separated from the straw, crop waste or other discardable part of the crop. The combine harvester 1, illustrated in FIG. 1, comprises a conventional threshing and separation system 11 including one or more threshing discs or cylinders 20, a straw beater 21 and a separator drum 22, co-operating with a set of concaves 23, 24, 25. Conventional straw walkers 26 are operable, in use, to discharge a mat of remaining crop material (i.e. mainly straw as most grain is separated therefrom) through a straw hood 27 to a straw chopper 28 that chops the straw and ejects it onto the field.

Grain that has been separated by the threshing and separating system 11 falls onto a first grain pan 30 of the cleaning system 12, that further also comprises a pre-cleaning sieve 31, positioned above a second grain pan 32, a upper chaffer sieve 33 and a lower grain sieve 34, disposed the one above the other behind and below the pre-cleaning sieve 31, and a cleaning fan 35.

The grain pans 30, 32 and the sieves 31, 33, 34 are oscillated generally back-and-forth for transporting threshed and separated grain from the first grain pan 30 to the pre-cleaning sieve 31 and the second grain pan 32 and therefrom to the sieves 33, 34. The same oscillatory movement spreads the grain across the sieves 31, 33, 34, while permitting the passage of cleaned grain by gravity through the apertures of these sieves. The grain on the sieves 31, 33, 34 is subjected to a cleaning action by the fan 35 that provides an air flow through the sieves to remove chaff and other impurities such as dust from the grain by making this material airborne for discharge from the machine.

Clean grain falls to a clean grain auger (not shown) in a clean grain auger trough 36 and is subsequently transferred by the auger and an elevator mechanism 37 to the grain tank 10. Incompletely threshed ears, the so-called "tailings", fall to a tailings auger (not shown) in a tailings auger trough 38. The tailings are transported sideways by this auger to a separate re-thresher 39 and returned by a tailings elevator 40 to the first grain pan 30 for repeated cleaning action.

A pair of grain tank augers 42 at the bottom of the grain tank 7 is used to urge the clean grain sideways to an unloading tube 43, wherein it is elevated by unloading augers (not shown) for discharge from the harvester 1.

Figure 2:
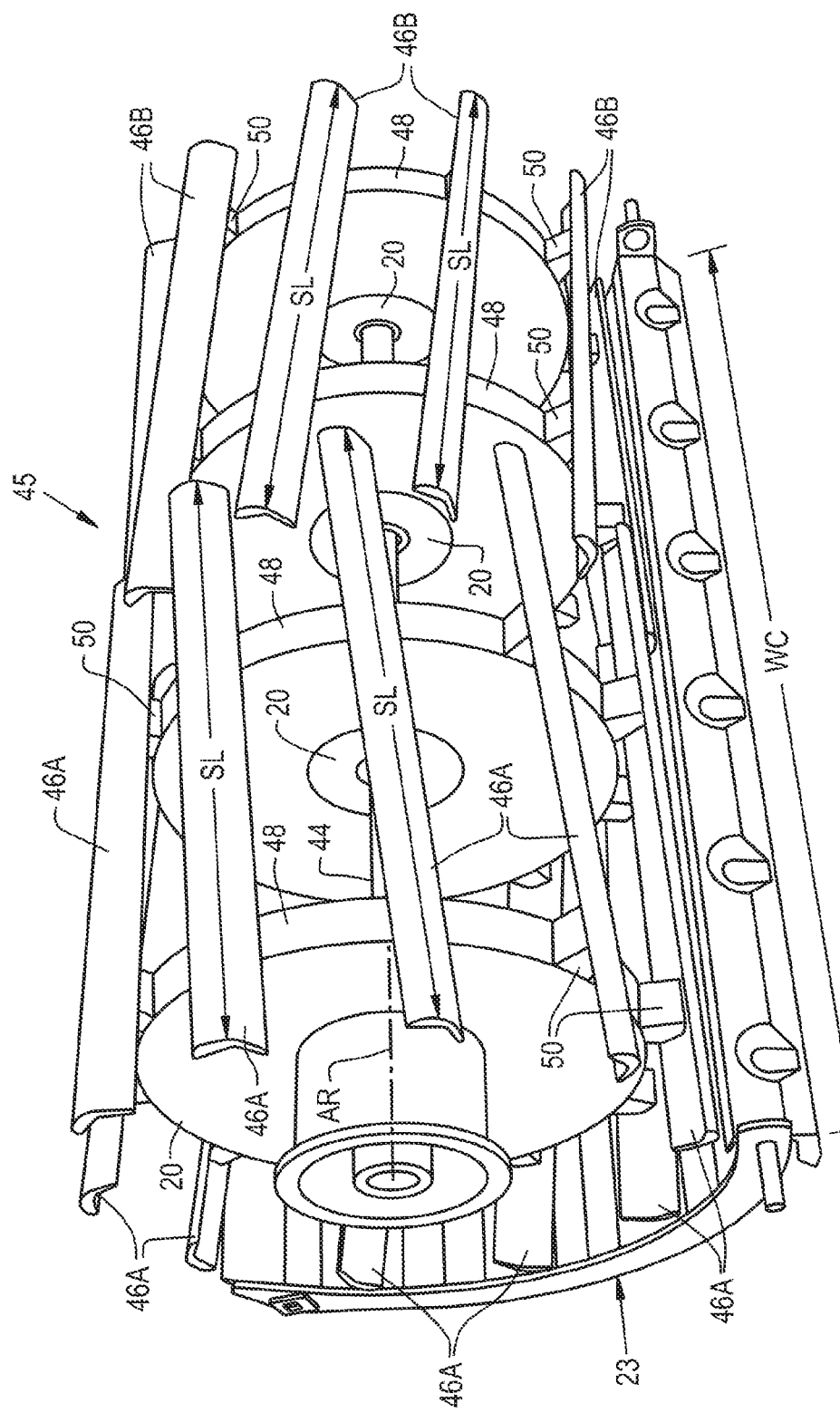
FIG. 2 is a perspective view of a portion of an embodiment of a threshing and separating system formed according to the present invention.

According to an aspect of the present invention, and referring now to FIG. 2, a perspective view of a portion of the threshing and separating system 11 is shown which generally includes the concave 23, a shaft 44 defining an axis of rotation AR, and a plurality of helically shaped slats 46A, 46B rotated by the shaft 44 to rotate about the axis of rotation AR and move crop material against the concave 23 to separate and thresh the crop material through openings formed in the concave 23. The slats 46A, 46B are helically shaped and arranged to wind around the axis of rotation AR defined by the shaft 44. As can be seen in FIG. 1, the axis of rotation AR defined by the shaft 44 is parallel to the concave 23 and transverse to the longitudinal axis A1 of the combine 1, i.e., the threshing and separating system 11 has a conventional configuration rather than a rotary, axial-flow configuration. The slats 46A, 46B can be rotated by the shaft 44 via connection to the shaft 44 by a series of threshing discs 20 that are rotationally mounted to the shaft 44, with the slats 46A, 46B and disc(s) 20 together forming a threshing drum 45 rotated by the shaft 44. Compared to using a cylindrical drum to rotationally couple the slats 46A, 46B to the shaft 44, utilizing a series of threshing discs 20 to rotationally couple the slats 46A, 46B to the shaft 44 can reduce the amount of friction experienced by crop material as the crop material is pushed by the slats 46A, 46B because a cylindrical drum has more surface area for the crop material to rub against compared to the series of threshing discs 20. The slats 46A, 46B pushing the crop material with less friction results in less dust being produced and the series of threshing discs 20 can be less expensive to produce than a cylindrical drum due to less material being used. However, it should be appreciated that the series of threshing discs 20 can be replaced by a traditional threshing drum having a substantially cylindrical shape, if desired. Each slat 46A, 46B can be connected to a circumferential surface 48 of the threshing discs 20 by a flange 50. The flanges 50 can be formed, for example, from a metal, such as iron or stainless steel, and be welded to the slats 46A, 46B and/or threshing discs 20 to rotationally couple the slats 46A, 46B to the shaft 44. It may be desirable to produce the flanges 50 from a relatively thick and dense metal, such as cast iron, to give the flanges 50 a relatively high concentrated weight in comparison to the threshing discs 20. As the flanges 50 are located on the peripheral surfaces 48 of the threshing discs 20, i.e., relatively far from the axis of rotation AR, high concentrations of weight in the flanges 50 can increase the rotational inertia of the discs 20 as the shaft 44 rotates, making the discs 20 less susceptible to rotation slowdowns caused by difficult crop and harvest conditions.

Figure 3:
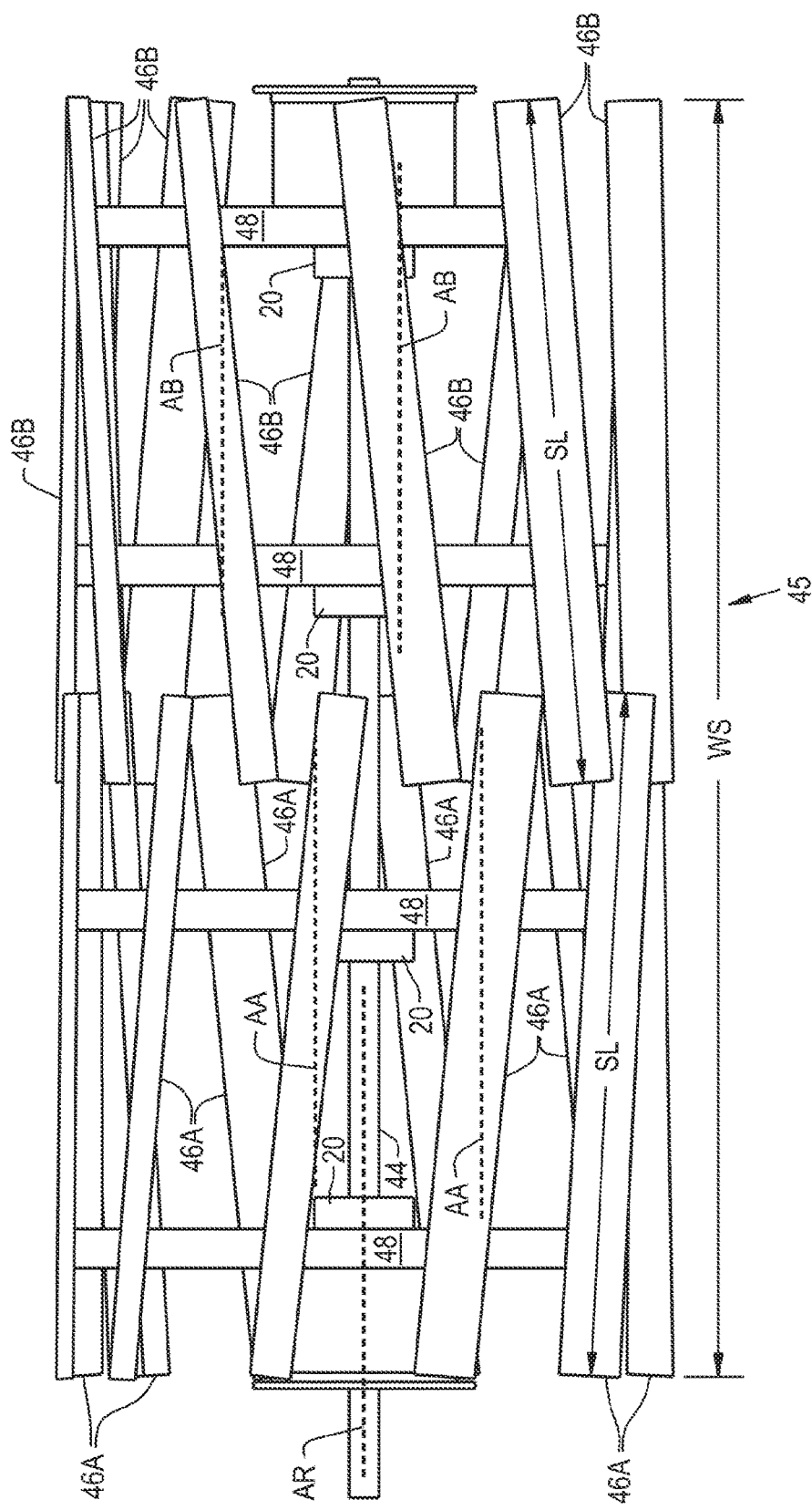
FIG. 3 is a front view of an embodiment of a threshing drum formed according to the present invention.
Figure 4:
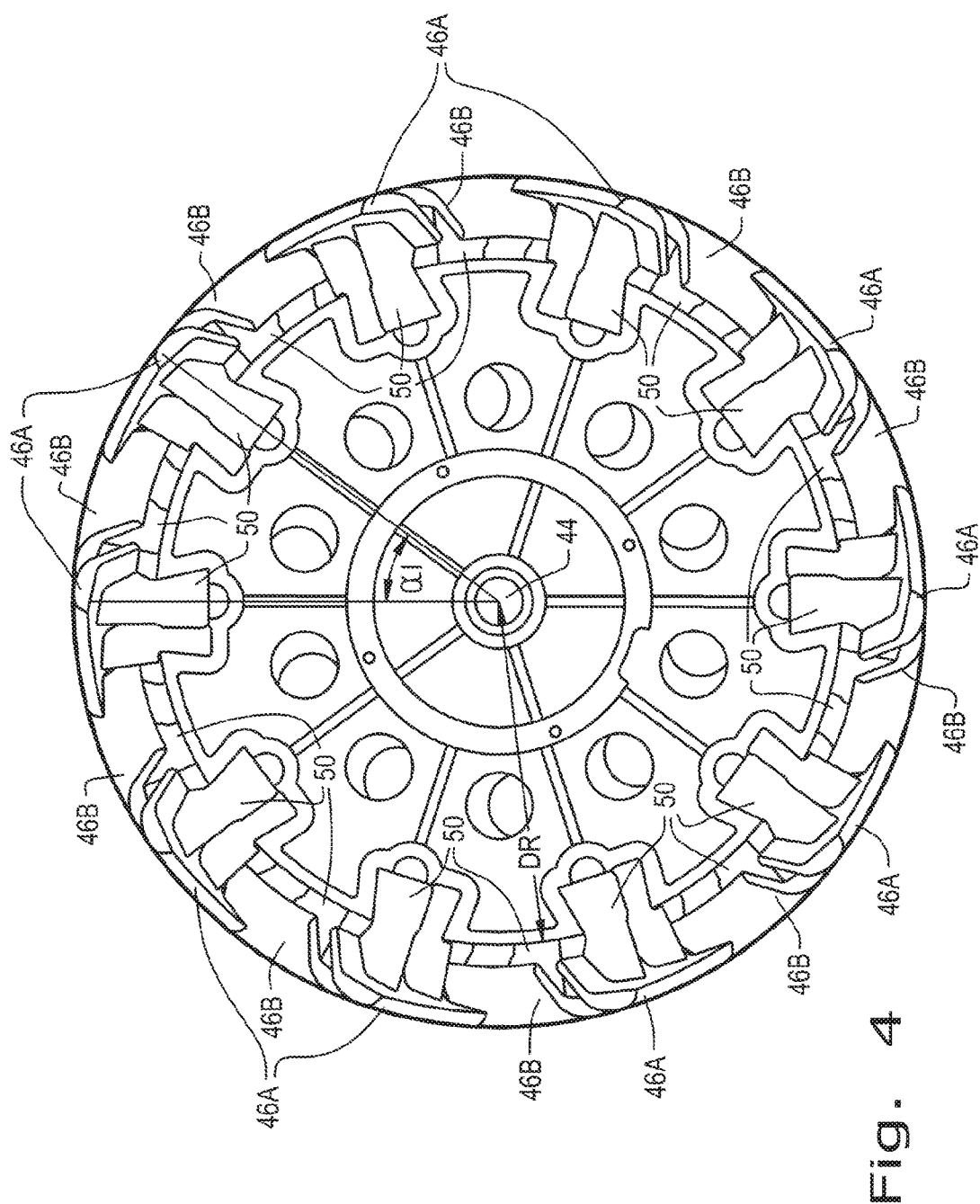
FIG. 4 is a side view of the threshing drum shown in FIGS. 2-3.
Figure 5:
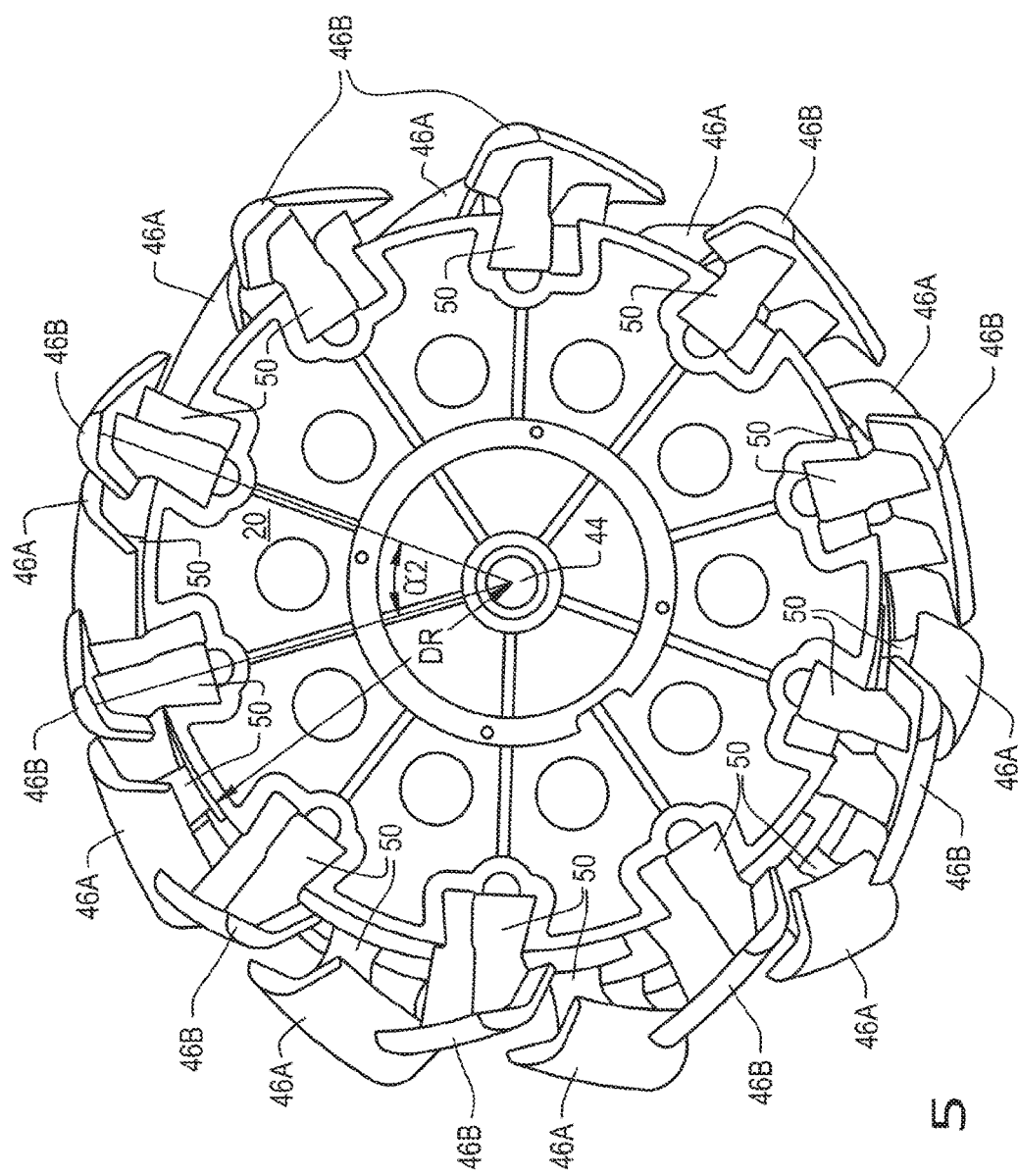
FIG. 5 is a perspective side view of the threshing drum opposite the view shown in FIG. 4.
Figure 7:
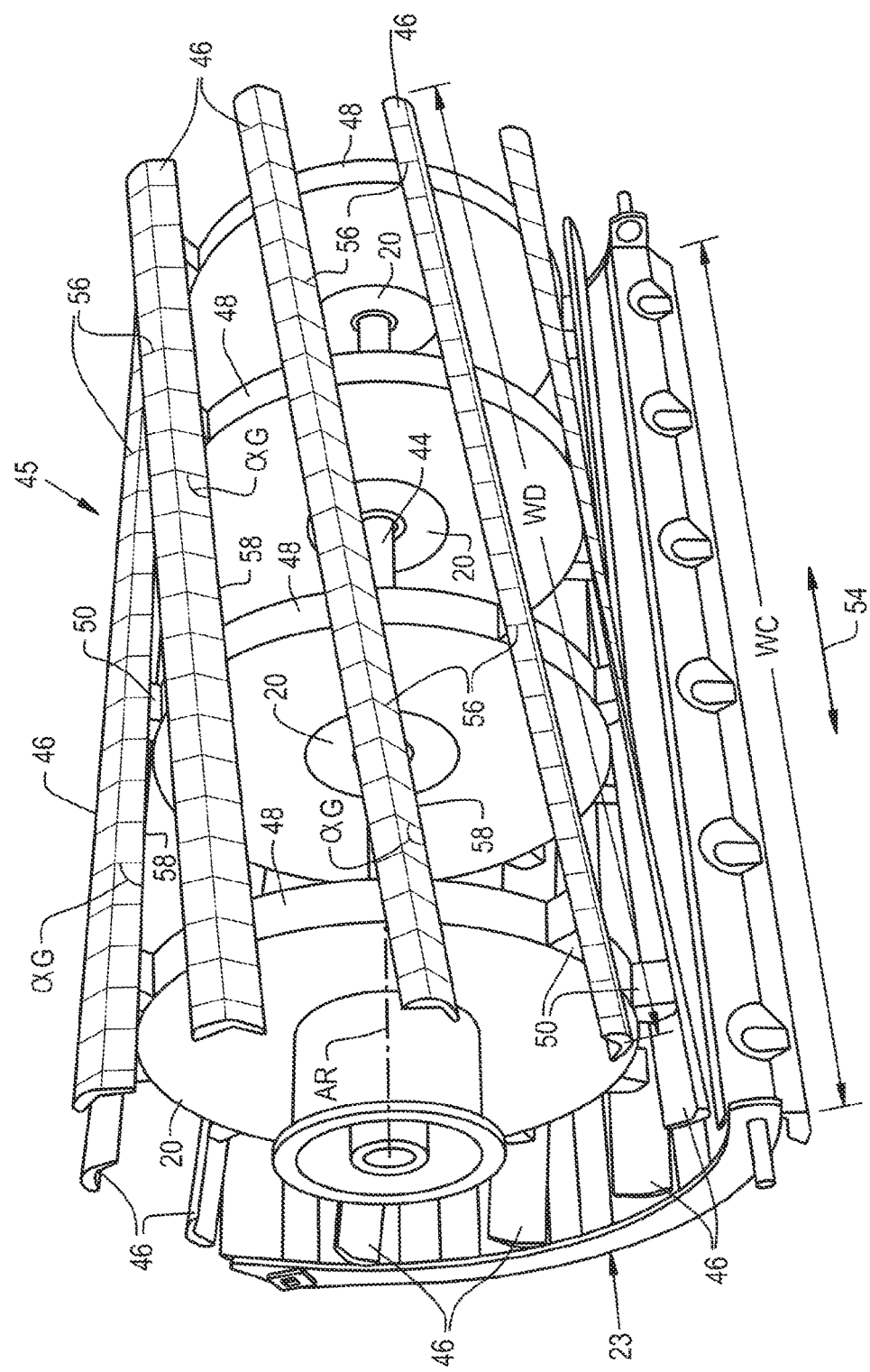
FIG. 7 is a perspective view of a portion of another embodiment of a threshing and separating system formed according to the present invention.

With further reference to FIG. 2, and also FIGS. 3-4, it can be seen that the slats 46A and 46B are arranged as a first set of slats 46A and a second set of slats 46B. The first set of slats are designated as 46A and shown in FIGS. 2 and 3 as being predominantly on the left side of the shaft 44 and the second set of slats are designated as 46B and shown in FIGS. 2 and 3 as being predominantly on the right side of the shaft 44. The drum 45 can alternatively have a single set of slats 46, as shown in FIG. 7. As can be seen in comparing FIGS. 4 and 5, which are views from opposite sides, each of the slats 46A comprising the first set of slats can have a left-handed helix shape and each of the slats 46B comprising the second set of slats can have a right-handed helix shape, i.e., the slats 46A of the first set are oriented oppositely to the slats 46B of the second set. The significance of this opposite orientation will be described further herein. The slats 46A of the first set are also staggered relative to the closest slat 46B of the second set, which can be seen in FIGS. 2-3. If the slat 46A of the first set is equidistant from two slats 46B of the second set, the slat 46A of the first set is staggered relative to at least one of the equidistant slats 46B of the second set. As used herein, "staggered" refers to the slat 46A of the first set and its closest slat 46B of the second set not being in line relative to the axis of rotation AR. For example, as shown in FIGS. 2-3, the slats 46A are staggered relative to their closest slats 46B both parallel and orthogonally to the axis of rotation AR, since the slats 46A and 46B are all substantially equidistant from the axis of rotation AR, with each slat's distance from the axis of rotation AR being approximately equal to a disc radius DR (shown in FIGS. 4-5) of the discs 20 plus a height of the connecting flanges 50 relative to the circumferential surfaces 48 of the discs 20. In this sense, each slat 46A and 46B defines a slat axis that extends through a center of the slat, illustrated as slat axis AA for slats 46A and slat axis AB for slats 46B, parallel to the axis of rotation AR and does not align with a corresponding slat axis of the closest slat(s) 46B, 46A of the other set relative to the axis of rotation AR. It should be appreciated that the slats 46A and 46B can be staggered in other ways, such as the slats 46A of the first set having a different distance from the axis of rotation AR compared to the slats 46B of the second set so the slat axes AA and AB of the slats 46A and 46B are not aligned.

Figure 6:
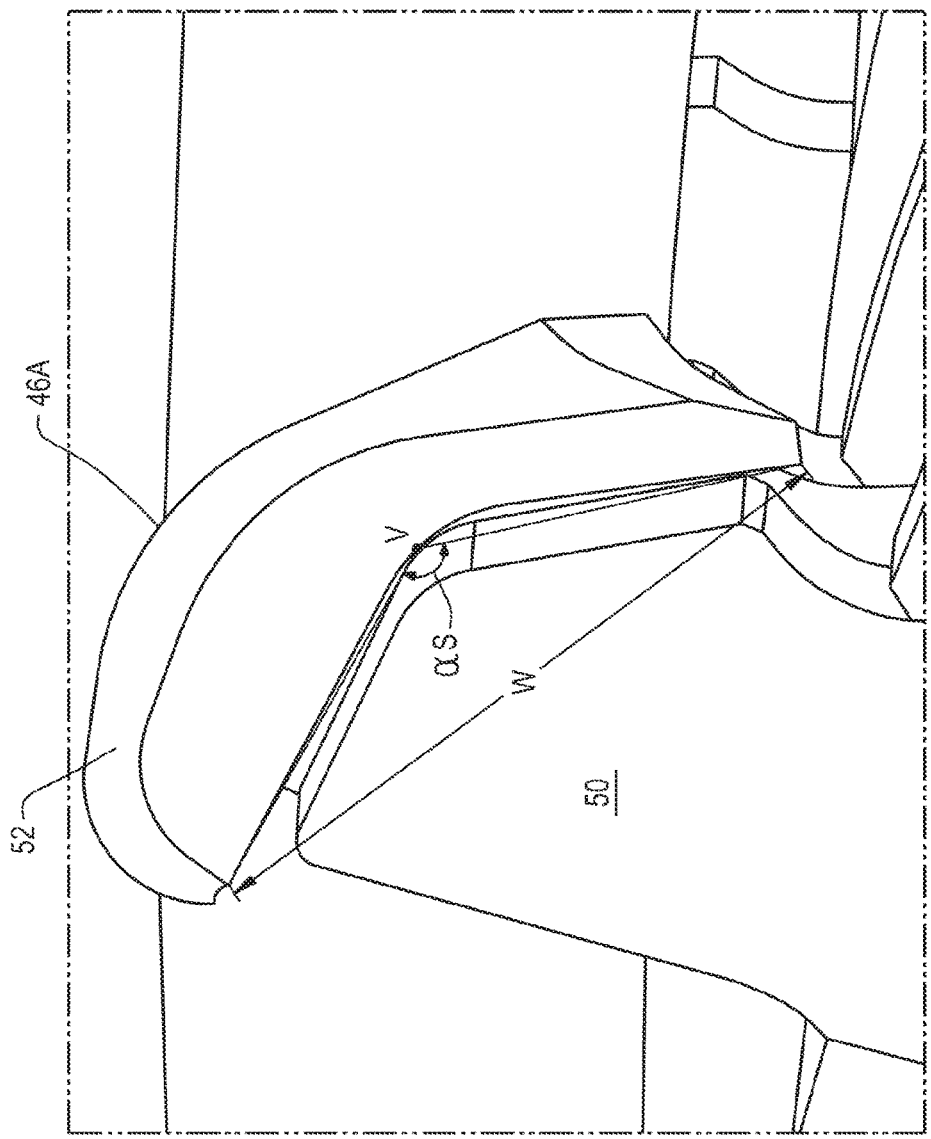
FIG. 6 is a perspective view of a slat formed according to the present invention.

As can be seen in FIGS. 2-3 and 6, the slats 46A and 46B each have a substantially helical shape so the slats 46A and 46B extend not only parallel to the axis of rotation AR, but also wind around the axis of rotation AR. In this sense, the slats 46A and 46B can each have a curvature about the axis of rotation AR in the direction of lengthwise extension, which can be best seen in FIG. 6. By adding a curvature to the slats' 46A and 46B extension, the slats 46A and 46B can extend 360 degrees about the axis of rotation AR, in aggregate, so there is at least a portion of a slat 46A and 46B available to contact incoming crop material as the shaft 44 rotates the slats 46A and 46B. Thus, the slats 46A of the first set can extend, in aggregate, 180 degrees or more about the axis of rotation AR and the slats 46B of the second set can extend, in aggregate, 180 degrees or more about the axis of rotation AR so a portion of one or more slats 46A, 46B can contact incoming crop material during the full 360 degrees of rotation of the shaft 44. Such a configuration allows at least one slat 46A, 46B to maintain constant contact with incoming crop material, i.e., continuously feed the crop material, and reduce the peak loads that occur due to discontinuous feeding of the crop material by the slats. It should be appreciated that both sets of slats 46A and 46B do not need to extend 180 degrees or more about the axis of rotation AR to extend the full 360 degrees about the axis of rotation AR; one set of slats may extend, for example, 190 degrees about the axis of rotation AR while the other set of slats only extends 170 degrees.

As shown, each of the slats 46A and 46B of each set can be arranged such that the first set of slats 46A and second set of slats 46B alternate about the axis of rotation AR, which can be seen in FIGS. 2-3. To alternate the slats 46A and 46B about the axis of rotation AR, each slat axis AA of the first set can extend between two slat axes AB of the second set, and vice versa, so that as the shaft 44 rotates the front-most slat will alternate between being a slat 46A of the first set and a slat 46B of the second set. Such a configuration can limit lateral movement of crop material as the crop material is pushed by the slats 46A and 46B against the concave 23 and help press the crop material evenly against the concave 23.

Referring now specifically to FIGS. 2-5, it can be seen that the slats 46A and 46B can each have a slat length SL, from one lateral end to the other, that is uniform for all of the slats 46A and 46B. Since the slats 46A and 46B can also be helical, the curvature of the slats 46A and 46B across the slat length SL can also be uniform for all slats 46A and 46B, such that the slats 46A and 46B are substantially identical in construction. The number of slats 46A and 46B in the first and second set, respectively, can also be equal. In this sense, the only difference between the slats 46A of the first set and the slats 46B of the second set is the helical direction of the slats 46A and 46B relative to the axis of rotation AR, with the slats 46A of the first set having an opposite helical direction to the slats 46B of the second set. When such a configuration is chosen, the slats 46A of the first set can be arranged in parallel, i.e., the slat axes AA of the slats 46A are parallel to each other about the axis of rotation AR, and the slats 46B of the second set can be arranged in parallel, i.e., the slats axes AB of the slats 46B are parallel to each other about the axis of rotation AR. Further, the slats 46A of the first set can be equally spaced apart about the axis of rotation AR and the slats 46B of the second set can be equally spaced apart about the axis of rotation AR. For example, when the first set of slats 46A includes ten slats 42A, as shown, and the second set of slats 46B includes ten slats 42B, as shown, each slat 46A can be spaced apart 36 degrees about the axis of rotation AR from adjacent slats 46A of the first set, illustrated by α1 in FIG. 4, and each slat 46B can also be spaced apart 36 degrees about the axis of rotation AR from adjacent slats 46B of the second set, illustrated by α2 in FIG. 5. Similarly, each slat 46A and 46B can have a helical shape defining an 18 degree curvature about the axis of rotation AR, so the ten slats 46A of the first set extend 180 degrees, in aggregate, about the axis of rotation AR and the ten slats 46B of the second set extend 180 degrees, in aggregate, about the axis of rotation AR. Since the slats 46A of the first set and the slats 46B of the second set can alternate about the axis of rotation, the number of slats in each set can be equal and each slat have similar helical curvature and spacing apart from other slats in the same set. For example, when there are eight slats 46A in the first set and eight slats 46B in the second set, each slat 46A and 46B can have a helical shape defining a 22.5 degree curvature and be spaced apart 45 degrees about the axis of rotation AR from the two closest other slats in the same set. It should therefore be appreciated how the curvature and spacing of the slats 46A, 46B about the axis of rotation AR can be influenced by number of slats 46A and 46B in each set to produce constant contact between one or more slats 46A, 46B and crop material that is being moved by the slat(s) 46A, 46B; the curvature of each slat 46A, 46B in a set about the axis of rotation AR can be 180 degrees divided by the number of slats 46A, 46B in the respective set and the spacing between adjacent slats 46A, 46B in a set about the axis of rotation AR can be 360 degrees divided by the number of slats 46A, 46B in the respective set.

To ensure that at least one slat 46A, 46B is in contact with crop material at all times as the shaft 44 rotates, the slats 46A of the first set can overlap with slats 46B of the second set about the axis of rotation AR. For example, when the slats 46A and 46B of each set alternate about the axis of rotation AR, each slat 46A of the first set can be arranged between two slats 46B of the second set about the axis of rotation AR, and vice versa, so a portion of the slat length SL of each slat 46A, 46B is overlapped with one or more adjacent slats of the other set. As shown in FIG. 2, the threshing and separating system 11 can define an effective slat width WS which is roughly equivalent to a width WC of the concave 23 and corresponds to the width of the threshing and separating system 11 that is covered by the slats 46A and 46B as the shaft rotates 44. When the slats 46A and 46B overlap, as shown in FIGS. 2-3, the effective slat width WS is less than a first slat length SL of a slat 46A and a second slat length SL of a slat 46B combined. When the slats 46A and 46B do not overlap, which is not shown, the effective slat width WS can be equal to or greater than the first slat length SL of a slat 46A and the second slat length SL of a slat 46B combined.

Referring specifically now to FIG. 6, an embodiment of a single slat 46A is shown. As can be seen, the slat 46A has a substantially helical shape at the surface with a curvature to allow the slat 46A to wind a desired number of degrees, such as 18 degrees, around the axis of rotation AR. The slat 46A can also have a region 52 of increased thickness where the slat 46A connects to the flange 50 to couple to the threshing disc 20. Due to the increased thickness of the region 52 where the slat 46A connects to the flange 50, the slat 46A can be formed with a compound curvature that varies across a width W of the slat 46A. For ease of description, the compound curvature of the slat 46A can be simplified by defining a slat angle αS between an interior slat vertex V, relative to when the slat 46A is rested on a surface interior side down and shown in FIG. 6 extending into the page, and the two ends of the slat 46A defining the width W therebetween. The slat angle αS can be a wide variety of angles, depending on the construction of the slat 46A, such as at least 110 degrees, preferably between 120 and 160 degrees, and more preferably between 140 and 150 degrees.

In an alternative embodiment, and referring now to FIG. 7, the threshing drum 45 can include a single set of helical slats 46 winding around the axis of rotation AR. In this embodiment, each slat 46 can have a similar helical direction, i.e., either left-handed or right-handed, rather than the two sets of slats 46A and 46B with opposite helical directions shown in FIGS. 2-6. Together, the slats 46 can wind 360 degrees or more around the axis of rotation AR so at least one slat 46 is in contact with crop material during a full rotation of the threshing drum 45. The slats 46 can also be located equidistant from each other and have a desired degree of helical curvature, similar to previously described slats 46A and 46B. Having a single set of similar slats 46 still allows for constant contact of crop material by the slats 46 as the slats 46 are rotated by the shaft 44 to reduce peak loads, while simplifying construction by not staggering oppositely oriented slats 46A and 46B across a width WD of the threshing drum 45. However, one issue that can occur when utilizing a single set of similarly oriented, helical slats 46 is that crop material will tend to travel across the slats 46 in a direction 54, which is parallel to the axis of rotation AR, along the width WD of the threshing drum 45 as the slats 46 are rotated. This is not ideal, as the crop material migration disrupts the even distribution of the crop material across the width WD of the threshing drum 45, which can lead to inefficiencies in the separation and cleaning of the crop material. To reduce the migration of crop material in direction 54 across the width WD of the threshing drum 45, each slat 46 can have precisely oriented grooves 56 formed thereon, as shown, in order to provide resistance to the crop material moving in direction 54 across the width WD of the threshing drum 45 as the slats 46 are rotated. The grooves 56 can, for example, be angled perpendicularly or non-perpendicularly relative to a longest edge 58 of the slats 46. If the grooves 56 are non-perpendicularly angled relative to the longest edge 58 of the slats 46, as shown, the grooves 56 can define one or more groove angles αG relative to the longest edge 58 that is between, for example, 10 to 75 degrees. It should be appreciated that while the grooves 56 are shown in FIG. 7 as having similar depths and having the same groove angle αG relative to the longest edge 58, differing groove regions can be formed on the slats 46 with the grooves of one groove region being differently shaped and/or oriented from grooves of an adjacent groove region. The grooves 56 thus allow a threshing drum 45 with a single set of similarly helical slats 46 to minimize the movement of crop material in direction 54 along the width WD of the threshing drum 45 and maintain an even distribution of crop material to the separation and cleaning systems.

The present invention, therefore, allows for constant contact of the crop material by the slats 46, 46A and 46B during rotation of the shaft 44 to minimize the occurrence of peak loads and discontinuous feeding that occurs in known threshing and separating systems. The present invention can thus allow smoother operation of the components of the threshing and separating system 11, reduce the vibrations and rumbling noise that occur in the combine 1, and produce more constant threshing of crop material. These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural harvester defining a longitudinal axis in a travel direction of the harvester, comprising:
   a chassis;
   a threshing and separating system carried by the chassis, the threshing and separating system comprising:
   a concave;
   a shaft defining an axis of rotation which is parallel to the concave and transverse to the longitudinal axis; and
   a plurality of slats rotated by the shaft and configured to move crop material against the concave, each of the plurality of slats having a helical shape winding around the axis of rotation,
   wherein the plurality of slats includes a first set of slats being predominantly on a left side of the shaft and having a left-handed helical shape, and a second set of slats being predominantly on a right side of the shaft and having a right-handed helical shape, and
   wherein at least one slat of the first set of slats is staggered relative to a closest slat of the second set of slats, such that a portion of a slat length of the at least one slat is overlapped with one or more adjacent slats of the second set.

2. The agricultural harvester of claim 1, wherein at least one of the plurality of slats has grooves formed thereon to reduce crop material movement in a direction parallel to the axis of rotation.

3. The agricultural harvester of claim 1, wherein the first set of slats, in aggregate, extends at least 180 degrees about the axis of rotation, and the second set of slats, in aggregate, extends at least 180 degrees about the axis of rotation.

4. The agricultural harvester of claim 1, wherein the first set of slats is equally spaced apart about the axis of rotation, and the second set of slats is equally spaced apart about the axis of rotation.

5. The agricultural harvester of claim 1, wherein the slats of the first set of slats extend in parallel relative to each other, and the slats of the second set of slats extend in parallel relative to each other.

6. The agricultural harvester of claim 1, wherein at least one of the first set of slats extends between two of the second set of slats.

7. The agricultural harvester of claim 1, wherein the first set of slats and the second set of slats are rotated by the shaft via connection to the shaft by at least one disc.

8. The agricultural harvester of claim 1, wherein the first set of slats and the second set of slats have an equal number of slats.

9. The agricultural harvester of claim 8, wherein the first set of slats and the second set of slats include at least 8 slats.

10. The agricultural harvester of claim 1, wherein the first set of slats and the second set of slats alternate about the axis of rotation.

11. The agricultural harvester of claim 1, wherein each slat of the first set of slats has a first slat length and each slat of the second set of slats has a second slat length equal to the first slat length.

12. The agricultural harvester of claim 1, wherein each of the plurality of slats has a curvature about the axis of rotation in a direction of lengthwise extension.

13. The agricultural harvester of claim 1, wherein the slats of the first set of slats are oriented oppositely to the slats of the second set of slats.

* * * * *